(12) United States Patent
Steinich

(10) Patent No.: US 7,555,841 B2
(45) Date of Patent: Jul. 7, 2009

(54) INCLINATION SENSOR

(76) Inventor: Klaus Manfred Steinich, Goethestrasse 8, 85604 Zorneding (DE)

( * ) Notice: Subject to any disclaimer, the term of this patent is extended or adjusted under 35 U.S.C. 154(b) by 0 days.

(21) Appl. No.: 11/809,101

(22) Filed: May 31, 2007

(65) Prior Publication Data

US 2008/0047154 A1 Feb. 28, 2008

(30) Foreign Application Priority Data

| May 31, 2006 | (DE) | ............. 10 2006 025 379 |
| Dec. 22, 2006 | (DE) | ............. 10 2006 061 198 |

(51) Int. Cl.
*G01C 9/06* (2006.01)
*G01C 9/12* (2006.01)
*G01C 9/20* (2006.01)

(52) U.S. Cl. .............. 33/366.17; 33/366.24; 33/396; 33/398

(58) Field of Classification Search ............ 33/346, 33/366.11, 366.14, 366.15, 366.17, 366.23, 33/366.24, 291, 296, 298, 402, DIG. 1, 391, 33/396, 398

See application file for complete search history.

(56) References Cited

U.S. PATENT DOCUMENTS

| 4,614,041 A * | 9/1986 | Darton et al. ............. 33/313 |
| 4,667,414 A * | 5/1987 | Russell .................... 33/364 |
| 4,791,730 A * | 12/1988 | Gill ........................ 33/361 |
| 4,866,379 A * | 9/1989 | Odagawa et al. ........ 324/207.12 |
| 4,885,535 A * | 12/1989 | Odagawa et al. ........ 324/207.13 |
| 4,910,459 A * | 3/1990 | Odagawa et al. ........ 324/207.13 |
| 5,282,318 A * | 2/1994 | Steiner ................... 33/355 R |
| 5,365,671 A | 11/1994 | Yaniger |
| 5,780,741 A * | 7/1998 | Raj ....................... 73/514.08 |

FOREIGN PATENT DOCUMENTS

| DE | 203 14 275 | | 11/2003 |
| JP | 62299718 A | * | 12/1987 |
| JP | 63128221 A | * | 5/1988 |
| JP | 63201519 A | * | 8/1988 |
| JP | 01163696 A | * | 6/1989 |
| JP | 02212709 A | * | 8/1990 |
| JP | 03037512 A | * | 2/1991 |
| JP | 03245013 A | * | 10/1991 |
| JP | 04062413 A | * | 2/1992 |
| JP | 06066826 A | * | 3/1994 |
| JP | 07004963 A | * | 1/1995 |
| JP | 07063556 A | * | 3/1995 |
| JP | 08145664 A | * | 6/1996 |
| RU | 2115091 C1 | * | 7/1998 |
| SU | 605084 A | * | 4/1978 |

* cited by examiner

*Primary Examiner*—R. A. Smith
(74) *Attorney, Agent, or Firm*—Head, Johnson & Kachigian

(57) ABSTRACT

Inclination sensors with magnetic XMR- or Hall-sensor-principles were implemented in the past by the pivotably supported indicator magnet being supported on the front face of the axle of a pendulum, with the consequence that the static friction of the support had to be overcome first, before the inclination sensor would react. Thereby very small and very slow inclinations often could not be detected. These designs always have a large amount of hysteresis. According to the invention this problem is being solved by the indicator magnet being mounted either on a float, or on a pendulum that is being supported ferrofluidic, whereby the static friction is much smaller or eliminated entirely.

29 Claims, 8 Drawing Sheets

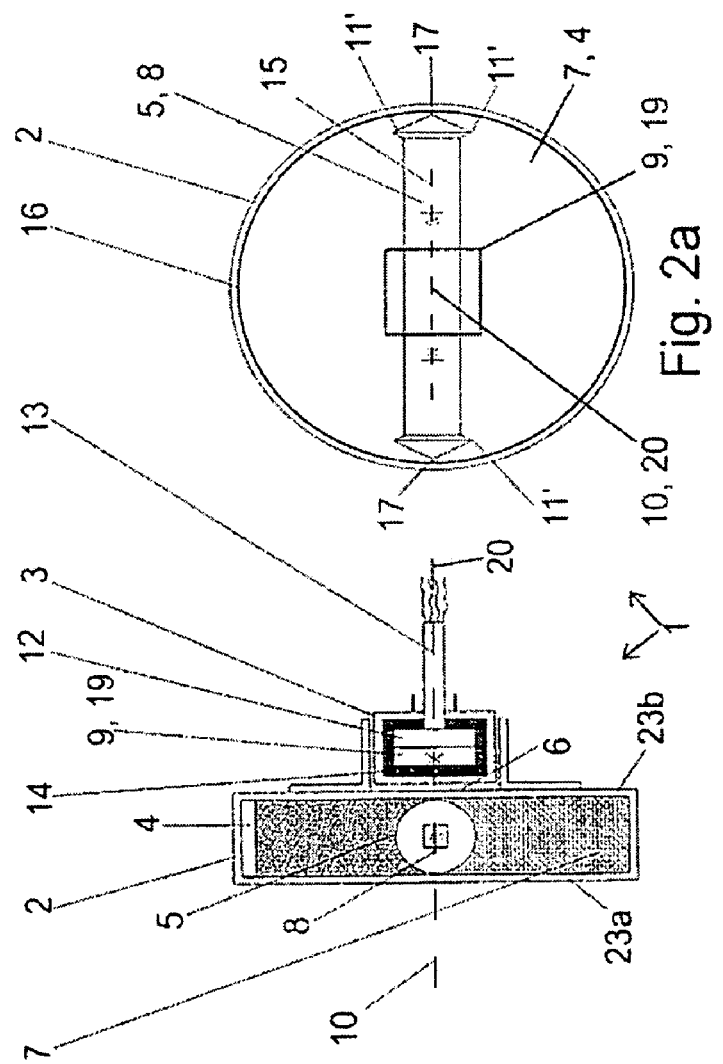

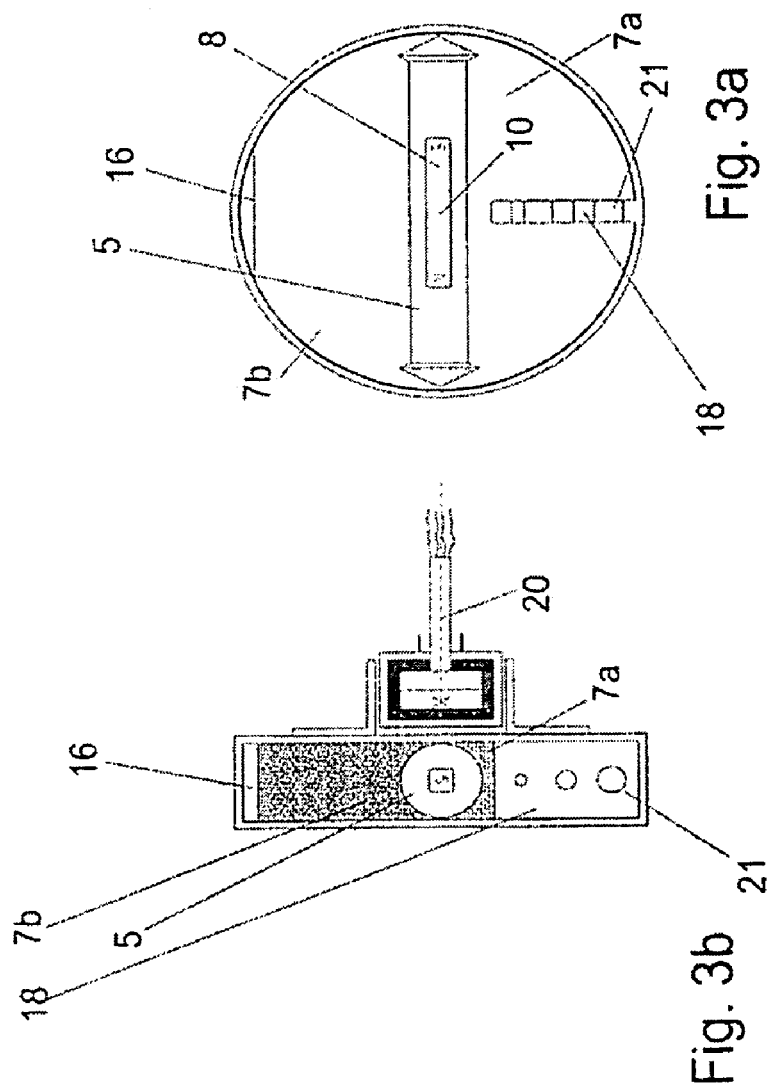

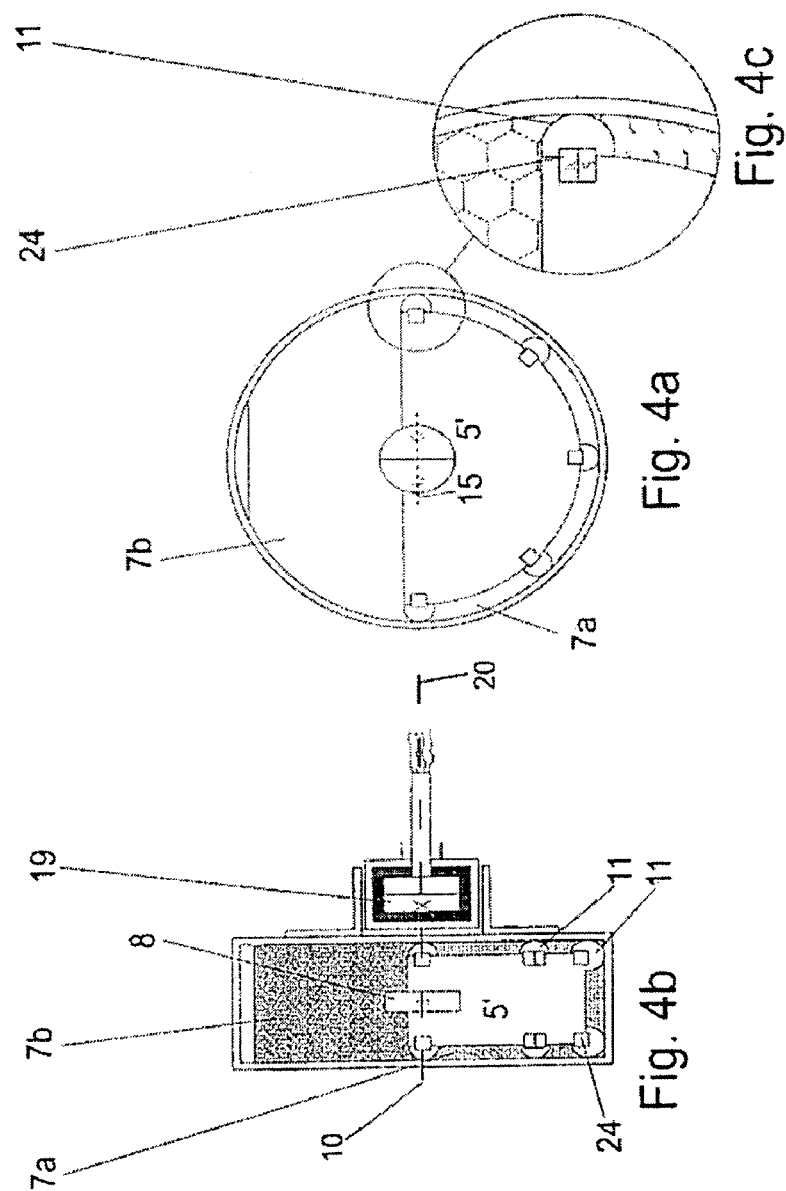

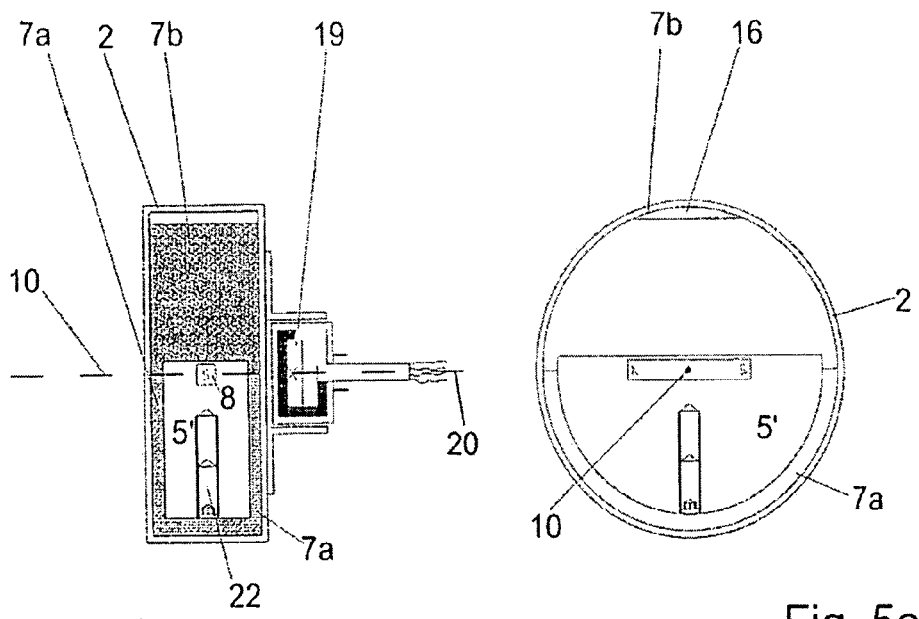

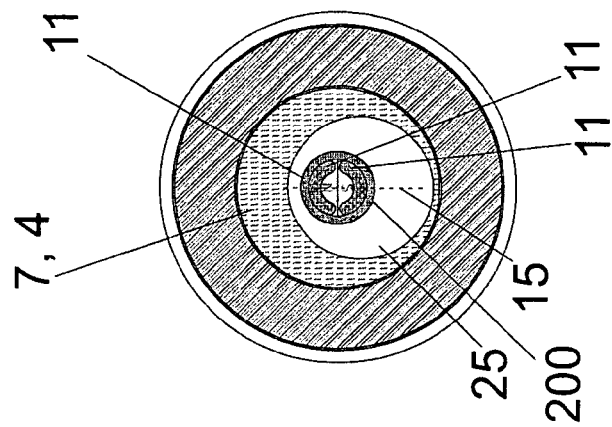
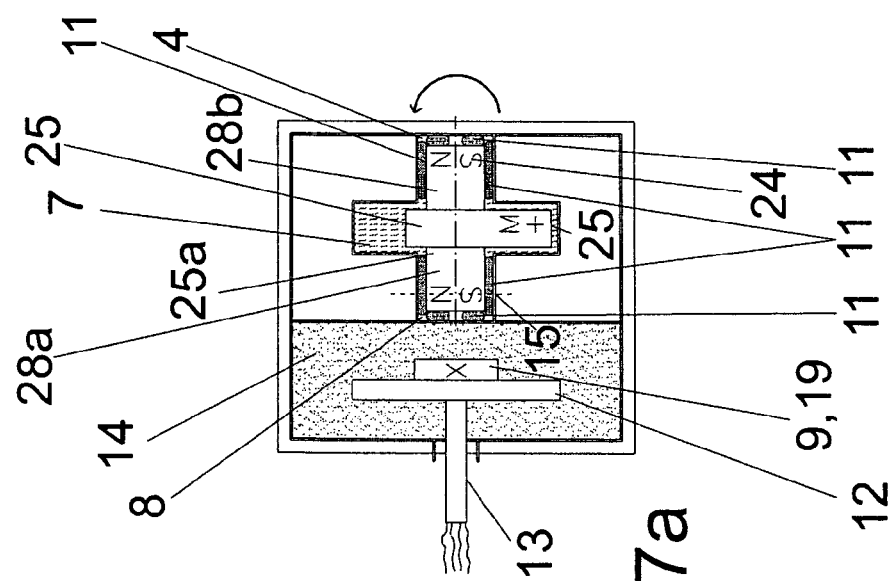

INCLINATION SENSOR

CROSS REFERENCE TO RELATED APPLICATIONS

This application claims priority to German Patent Application No 102006025379.5 filed May 31, 2006 and to German Patent Application No. 102006061198.5 filed Dec. 22, 2006.

STATEMENT REGARDING FEDERALLY SPONSORED RESEARCH

Not Applicable

INCORPORATION-BY-REFERENCE MATERIAL SUBMITTED ON A COMPACT DISC

Not Applicable

BACKGROUND OF THE INVENTION

1. Field of the Invention

This invention relates to an inclination sensor

2. Description of Related Art

There are various designs of inclination sensors.

Previously, mercury was very often used in order to detect the shifting position of the mercury in the inclination sensor. For reasons of environmental concerns, the application of such mercury sensors is no longer legal in most cases.

Thereafter, pendulum sensors are commonly used. In this context, a pendulum always assumes an exactly vertical position corresponding to the current gravitational force and possibly attenuated with the pendulum disposed in an attenuation chamber filled with attenuation fluid.

On a support axis of the pendulum, which permeates the pendulum chamber towards the sensor chamber, an angle sensitive element whose rotational position was detected is disposed in the sensor chamber, e.g. an incremental rotating disk which is scanned by a reading head.

Disadvantages in this context were the long-term tight-pass-through of the pendulum shaft through a divider wall and the long-term smooth operation of the bearing of the pendulum axis which allow a fast adaptation of the pendulum position to gravity, also when angular changes are minor.

Besides that, it is known from German Patent No. DE 203 14 275 to no longer run the pendulum axle through the divider wall into the sensor chamber but to dispose an indicator magnet on the pendulum axle within the pendulum chamber and to sense the rotational position of this magnet contact-less through the non-magnetizable divider wall, through a magnetosensitive sensor, which is disposed on an opposite side in the sensor chamber.

Also, there still exists the persistent problem that relatively high support forces are to be received in a small central bearing axle reliably and with extremely low static friction in order to make the pendulum deflect even upon the smallest angular changes.

It is, furthermore, known to use singular Hall elements as magnetosensitive elements, thus Hall effect sensors, as described in U.S. Pat. No. 5,365,671.

A single Hall Effect sensor, however, can only measure the intensity of the magnetic field, in which it is disposed, and thus the measuring result is strongly dependent on the distance of the Hall sensor from the activating indicator magnet.

Therefore, the moving body which aligns itself with gravity and which is mounted to the indicator magnetic is received in a very tight surrounding support housing. Thus, in order to avoid the friction at the surrounding support surfaces, the cavity in which the moving body is located is completely filled with a fluid whose specific weight corresponds to the one of the pivoting body, so that the body floats in the fluid quasi weightlessly (column 2, line 45 of U.S. Pat. No. 5,365, 671). Thus, this is a pendulum with a center of gravity outside of the point of rotation of the pivoting body, whose support is formed through the outer surrounding guide surfaces.

BRIEF SUMMARY OF THE INVENTION

It is an object of the present invention to provide an inclination sensor which is simple and inexpensive to produce and particularly avoids the disadvantages of the state of the art.

By dispensing with the mechanical support, like in a pendulum with a surrounding, mostly small diameter bearing, the support forces of a float can be kept much lower, depending on the relative form of the float, with respect to the float chamber, but also depending on the fluid used and further aids.

The contact between float and float chamber, if it occurs at all, only occurs at the outer circumference of the float, and thus at an already much larger effective diameter than at the rather punctiform central support of a pendulum. In addition, the size of the contact surface can thus be provided much smaller. The mechanically more simple configuration of a float housed in a fluid compared to a mechanically exact support, is traded off against the disadvantage that thus the pivot axis of the float can be held less exact than through a mechanical support, on the one hand, this is negligible in the light of the sensing precision, with which the magnetostrictive sensor senses the rotational position of the indicator magnet through the separation wall.

Furthermore, with use of a pendulum the amount of the reversing moment depends on the mass of the pendulum and its downward distance from the pivot axis; this disadvantage is avoided. Thereby, a pendulum per definition has to have a minimum extension in vertical, the radial direction.

Like a pendulum, the float can be formed relative to the fluid, so that its center of gravity is located below the fluid level. Then, the float settles analogous to the fluid level; the fluid level, in turn, settles depending on gravity.

The other possibility is that the center of gravity of the float is exactly at the elevation of the fluid level. Accordingly, the float cannot only assume one rotational position but several different rotational positions within the fluid, rotatable around its longitudinal axis which is disposed at the elevation of the fluid level. In particular, it can be provided rotationally symmetrical, thus unstable, which is not detrimental however for the function of the sensor.

By using a multi-Hall sensor, in particular a multi-Hall-IC, provided as a vertical or horizontal multi-Hall-IC, a static gradient can be measured, thus how much the intensity of the present magnetic field increases or decreases over the extension of the sensor, in particular of an IC, through which the inclination of the axis of the generating magnetic field relative to the extension of the sensor can be calculated.

This has the advantage that only the angular position of the magnetic field axis relative to the perpendicular of the sensor axis, thus of the pivot axis, is being detected; however, all other angular deviations of the magnetic field axis can hardly degrade the measuring result.

When the tilt of the magnet axis relative to more than one pivot axis is to be detected in certain particular applications, the use of several identical sensors according to the invention with different orientations is recommended.

Accordingly, the indicator magnet is positioned at the float in the inclination sensor this way. Additionally, the elevation of the fluid level is adjusted relative to the submersion dept of the float so that the indicator magnet is located at the elevation of the sensor, in particular of the perpendicular of the sensor surface (target pivot axis).

Additionally, the indicator magnet is disposed at the float so that the magnet axis is located parallel, in particular, identical to the fluid level.

In order to assure that the magnet axis, in particular the indicator magnet itself that causes it, is always exactly at the elevation of the sensor, in particular of the target pivot axis, the contour of the float is generally adapted to the contour of the float chamber as closely as possible in order to avoid a drift of the float.

Accordingly, the float is being held on its pivot axis also in lateral direction in the float chamber, e.g. by the width of the float in top view only being marginally smaller than the interior width of the float chamber.

Thereby, the remaining free space and the amount of required fluid are also reduced which, in turn, reduces the propensity of the fluid to perform uncontrolled sloshing during strong inclination changes.

The side walls of the float chamber, extending transversal to the float chamber and also to the float, are preferably disposed in parallel to each other and perform the lateral guidance of the float.

In order to reduce the friction between the float and the walls of the float chamber, the abutment between the two can only be performed through small surface protrusions like approximately punctiform knobs, which are either disposed at the interior surfaces of the float chamber or at the exterior surfaces of the float. Through a well lubricating fluid, as e.g. a thin oil, the dynamic friction in between is reduced additionally.

With an approximately cylinder disk shaped, vertically standing shape of a float chamber, still, various different geometric embodiments of the float itself are possible.

A preferred shape is a stick-shaped float having a length only marginally smaller than a diameter of the float chamber and having ends strongly rounded or preferably pointed.

Thus, the center of gravity of the stick-shaped float is located in the middle of its cross section, and its length and the specific weight of the float are selected so that exactly half of it submerges into the fluid that carries it. Thus, its center of gravity is at the elevation of the fluid level, The cross section of the stick is provided round, at least in the area of its largest exterior diameter, while the other areas of the cross section which have a smaller diameter can also have another cross sectional shape.

The largest round exterior diameters serve for a lateral support at the outer walls of the float chamber, which are parallel to each other, with a small contact surface, and are disposed as circumferential protrusions, preferably close to the ends of the stick-shaped float. In contrast to a pendulum, thus the center of gravity of the float does not have to be remote from the pivot axis but can be located on the pivot axis, in particular, in such a stick-shaped float.

Thus, the elevation of the fluid level thus has to be selected so that the float preferably with its longitudinal axis is located in the middle of the height of the float chamber, thus at its largest diameter.

Through a slosh baffle protruding upward, e.g. from the lowest point of the float chamber, excessive sloshing back and forth of the fluid during fast motion of the inclination sensor around the pivot axis can be avoided and attenuated, in particular, though defined pass-through openings disposed in the slosh baffle acting as throttles for the fluid. However, the maximum defection of the float is also reduced to a range of little less then ±85°.

As a second embodiment, the center of gravity of the float can be located below the fluid level; and the float can act as a floating pendulum in the fluid. Thus, the lower half of the contour of the float, seen in the direction of the pivot axis can be adapted to the contour of the bottom of the float chamber and can be provided in the shape of a circular segment or as a semicircle, which reduces the amount of fluid required. Also, the upper half of the contour of the float chamber can be adapted to the contour of the float, e.g. by the float, and also to the float chamber having the shape of a standing cylinder-shaped disk.

Another possibility of guiding and positioning the float is to dispose a support magnet on the float, e.g. on the pivot axis on the side opposite to the sensor, and an opposite magnet at the opposing wall of the float chamber, which attract each other, thereby positioning the float on the pivot axis at least at one end of the pivot axis so that the other end working together with the magnetosensitive sensor only has to be prevented from too strong deviations from the pivot axis, which is already satisfied through the parallel side walls perpendicular to the pivot axis with little distance to the float.

The indicator magnet and, in particular also, the support magnet are preferably located in the interior of the e.g. hollow float and/or instead of the support magnet, a Ferro fluid, which is sometimes called a magnetofluid, thus a fluid which can be magnetized can also be used as a magnetic fluid, which serves in particular for the generation of an adjustable damping effect upon the motions of the float.

Guiding the float through a support magnet on a pivot axis also allows for the possibility to provide the float with two pivot axes which intersect, seen in top view, on which magnetic support and at the other end magnetosensitive sensing of the pivot position are provided respectively. If the magnetic support can thus be activated selectively, e.g. through using electro magnets, with the help of the same float, thus in short intervals through alternating activation of one of the support magnets, and of the associated magnetostrictive sensor, the inclination of the e.g. the spherical float relative to the two separate pivot axes can be detected.

Instead of only one fluid, the float chamber can also contain two different fluids with different specific weight, which are difficult to mix; wherein the specific weight of the float is selected so that it floats on a heavy fluid and sinks in lighter fluid. Thereby, the difference between the specific densities of the two fluids can be adjusted lower than this is normally possible between fluid and gas, and hereby the response characteristics of the sensor can be improved.

Still, it is being recommended when only one fluid is present to leave an additional gas volume in the float chamber which serves as an expansion volume for the temperature related expansion of the fluid.

The float itself, as well as the outer wall of the housing facing the sensor, is normally made from material that cannot be magnetized, plastic in particular.

The sensor can be disposed in a loose manner on the outside of the float chamber, or the housing can have a second chamber as a sensor chamber which is proximal and separate from the float chamber in which the sensor is housed in a protected manner.

Preferably, it is recommended to encase the sensor together with additional parts of possibly required processing electronics, including the necessary cable connection, into a tight component which is also tight against longitudinal water.

As spacers and also as damper between the outer surface of the float and the walls of the float chamber, preferably at locations of the outer circumference of the float, are punctiform or drops of a fluid that can be magnetized (Ferro fluid) and can be held by positioning magnets located within the float.

In the same way, as the use of a float serves to reduce holding forces between the float and the surroundings, the reduction of the holding forces can be accomplished through a magneto fluidic support of a body whose center of gravity however, is then offset from the pivot axis, and which is thereby a pendulum. Thus, the pendulum body supported in this manner, or at least the pendulum axle resting on a fluid film, thus the Ferro fluid; though it is not a float in the exact physical sense, since the specific weight of the pendulum in this case can also be larger than the specific weight of the ferrofluidic fluid.

The desired effect of a reduced static friction is accomplished by the Ferro fluid including microscopic small particles which can be magnetized and by holding magnets being disposed in the body at which the ferrofluidic fluid is to accumulate, which has a low friction resistance, and in addition, can also have attenuating properties.

In the ferrofluidic pendulum, this can be the part of the pendulum that needs to be supported, e.g. the support pinions of the pendulum or also the surrounding bearing support which, contrary to the previously described solution, shall have an interior contour tightly adapted to the contour of the part to be supported in order to keep the Ferro fluid layer as small as possible and to, thus, predetermine the position of the pendulum in an exact manner.

When in case of such a ferrofluidic support of the pendulum itself, in particular its axle body or axle stub, are magnetic in order to keep the ferro fluid on its radial and/or axial outer side, this magnetization can be disposed with a pole axis perpendicular to the pivot axis of the pendulum and can thereby be used on the one front side of the pendulum directly as an indicator magnet for the magnetosensitive sensor located outside of the chamber of the pendulum.

The pendulum itself can be made in one piece or from several pieces, e.g. as a pendulum weight slid onto the axle body and fixed with respect to the rotation position, with a center of gravity lying outside of the pendulum axis. Thus, in particular, the axle body should be very much longer in axial direction than its diameter, at least twice as long, better four times as long, and a separate indicator magnet should be located on one of its face sides. Wherein for this purpose preferably the axle body protrudes at least on one side from a magnetically shielding housing made from ferromagnetic material. The pendulum can also be made from several parts which are not connected in a mechanically solid manner, e.g. a sphere on the one hand, which assumes its position in an annular channel around the axle body following gravity.

Since the axle body is magnetic with a pole axis diametrically through the pivot axis of the axle body and the ball is made from ferromagnetic material, both are coupled in a contact-less magnetic manner with respect to their rotational position around the pivot axis of the axle body, but with the position of the ball aligning the axle body so that it always points to the sphere with the same of its two poles.

Otherwise, the axle body, also in this solution, is supported ferrofluidic in radial and particularly also axial direction.

BRIEF DESCRIPTION OF THE DRAWINGS

FIGS. 2a-b show an embodiment of the present invention with a stick-shaped float.

FIGS. 3a-b show an embodiment of the present invention with an additional slosh baffle.

FIGS. 4a-c show an embodiment of the present invention with a semicircular float.

FIGS. 5a-b shown an embodiment of the present invention with a trimmer.

FIGS. 7a-b show a pendulum with ferrofluidic support in a second embodiment.

DETAILED DESCRIPTION OF THE INVENTION

Figure 1A:
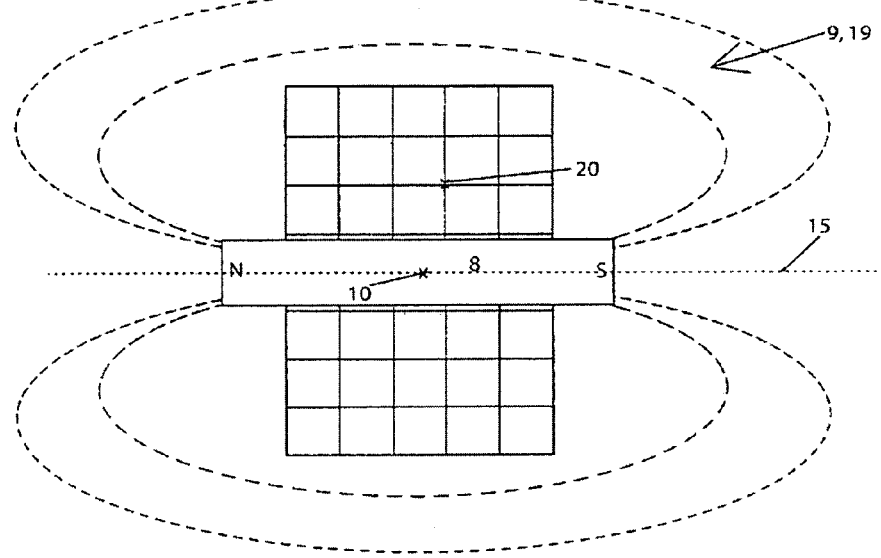
FIGS. 1a-b show a configuration of the inclination sensor in principle.
Figure 1B:
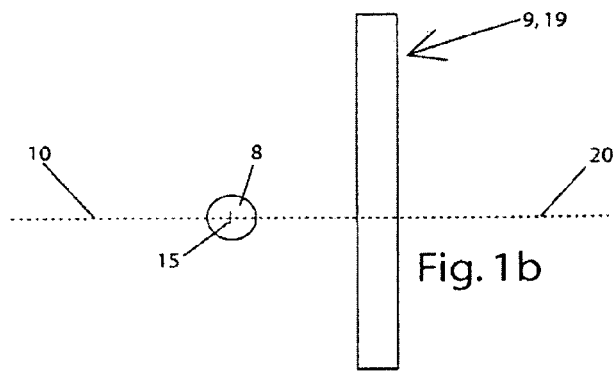

FIGS. 1a-b show a basic configuration used for an inclination sensor 1: a flat magnetosensitive sensor 9 capable of measuring a static gradient of a magnetic field, e.g. a multi-Hall-chip 19, is disposed relative to an indicator magnet 8, e.g. a permanent magnet, with a pair of poles, so that its pole axis 15 extends in parallel in front of the sensor 9, 19.

Through pivoting an indicator magnet 8, thus pole axis 15, relative to the perpendicular of the surface of sensors 9, 19, thus around a neutral magnet axis 20 or an approximately parallel pivot axis 10, sensor 9 determines the tilt, e.g. through the multi-Hall-IC 19 relating the differences of the magnetic flux densities of the particular surface areas of the IC relative to each other.

In comparison, changes in the distance of pole axis 15 relative to the surface of the sensor, and thus also pivoting motions of pole axis 15 around an axis located parallel to the sensor plane, hardly affect the measurement result.

FIGS. 2 through 5 show in Figure "a" an actually implemented inclination sensor respectively in the viewing direction of the pivot axis, thus analogous to FIG. 1a, and in Figure b in side view thereof, thus analog to FIG. 1b.

FIG. 2 shows a complete inclination sensor 1.

A stick-shaped indicator magnet 8 is located in an also stick-shaped float so that pole axis 15 of the indicator magnet coincides with the longitudinal direction of the stick. Float 5 floats on a fluid 7 which is received in a housing 2 which is closed on all sides and which has the shape of a vertically standing circular disk.

The length of float 5 amounts approximately to the diameter of the interior of a float chamber 4, and the filling amount of the fluid is selected so that indicator magnet 8 and float 5 are at half elevation, thus, at the location of the largest diameter of float chamber 4. The remaining free space, thus approximately an upper half of float chamber 4, is a gas volume 16 filled with air or with an inert gas, or to a large extent with a lighter fluid.

Outside of the float chamber, on the outside of a rear wall 23b of the float chamber, a multi-Hall-IC 19 is disposed as a magneto sensitive sensor 9, with its main plane parallel to the main plane of disk-shaped float chamber 4 and also parallel to pole axis 15 of indicator magnet 8.

The IC 19 is disposed preferably together with processing electronics on a printed circuit board 12 and received in a proper housing, the sensor chamber 3, and encased by an encasement material 14, mostly epoxy resin.

A cable 13 conducts electrical signals of sensor 9, or of the processing electronic, from sensor chamber 3 toward the outside for further processing.

However, without these protective measures, thus without encasement, sensor 9 can also be positioned proximal to the float chamber.

It is only important that sensor 9, thus the IC 19, is connected in a rotationally fixed manner relative to a magnetic neutral axis 20, thus the perpendicular on the sensor surface, with a float chamber 4, e.g. glued or mounted with threaded bolts, so that sensor 9 is pivoted when the float chamber and the entire inclination sensor are pivoted around this axis.

Since in this case, float 5 and pole axis 15 continue to maintain horizontal attitudes, a relative rotation of pole axis 15 around the magnetic neutral axis 20 occurs. This dislocation is detected by the sensor.

For this reason, preferably pivot axis 10 of the indicator magnet 8, around which the indicator magnet rotates relative to the housing 2 when the housing is titled, should possibly be identical with the neutral magnetic axis 20 of sensor 9. However, limited deviations are harmless.

An important factor of such inclinations sensors is the triggering precision, and this mostly depends on the indicator element, thus indicator magnet 8, already moving relative to sensor 9 upon the smallest deflections.

For this reason, it is necessary that no, or as small as possible, static friction forces occur between float 5 and the surrounding walls of housing 2.

This is influenced, on the one hand, through the type of fluid used and, in particular, its surface tension which must be as small as possible.

On the other hand, it is attempted to minimize the static friction through reducing the contact surface of the float relative to the housing.

There, stick-shaped float 5 is provided with a cone shaped tip at the ends respectively. The cone shape tip circumferential base protrudes beyond an outer circumference of the cross section of float 5 in an annular manner, shaped as an annular circumferential protrusion 11'. The diameter of the annular protrusion 11' is only slightly smaller than the distance between the parallel front and back walls 23a, b of float chamber 4. The distance of the tips 17 is only slightly smaller than the diameter in float chamber 4 at the elevation of tips 17, in particular, the largest diameter of float chamber 4.

The solution of FIG. 3 differs from the solution of FIG. 2 through the additional slosh baffle 18 protruding from the deepest area of housing 2 upward in the direction of float 5. The baffle 18 has several functions.

On the one hand, an uncontrolled sloshing of fluid 7 through the slosh baffle, which reaches almost the middle thus to float 5, can be avoided during strong and fast inclination movements. Through a throttle opening 21, the size and number is selected depending on the viscosity of the fluid, it is being assured however that a flow of the fluid in lateral direction is possible in spite of that.

In addition, slosh baffle 18 avoids a tumbling of float 5 around the axis 10 or 20, thus by a full 180°, since this could not be handled by the processing electronics.

Furthermore, the solution of FIG. 3 differs from the one in FIG. 2 in that an additional, lighter second fluid 7b is located in the float chamber above a first fluid 7a and, thus, also above float 5, which does not or hardly mixes with the first fluid 7a and which is lighter than the specific weight of the float.

However, the interior of float 4 is not completely filled with fluids: a gas volume 16 remains above the second fluid 7b as an expansion volume for temperature expansions of the two fluids.

Otherwise, the solution of FIG. 3 corresponds to the one of FIG. 2.

FIGS. 4a and b show an inclination sensor in which float chamber 4 is filled with said two fluids 7a, b which have different weight and which cannot be mixed. Preferably, float 5' has basically a different form.

Seen in the direction of the axes 10, 20, float 5' is provided approximately semicircular, analogous to the contour of the lower half of float chamber 4 but a little smaller in diameter.

Indicator magnet 8 with pole axis 15 is oriented the same way as in FIGS. 2 and 3, that is, as a round indicator magnet 8 not a stick magnet, and sits at the upper edge of the semicircular float and, thus, at the same position with reference to the float chamber as in the previous solutions, that is, approximately central and at the neutral magnetic axis 20.

Since float 5' fills the lower half of the float chamber almost completely, only a relatively small amount of said first fluid 7a is required to hold the float in position in the lower half of float chamber 4. The specific weight of said first fluid 7a is selected relative to the specific weight of float 5' so that float 5' submerges into said first fluid 7a almost completely.

Along its longitudinal outer edges, float 5' has punctiform or half spherical drops of a ferro fluid 11 which serve as spacers relative to the interior walls of float chamber 4, thereby damping in case of contact and keeping the contact surface between float 5' and housing 4 small, as well as the resulting holding forces.

Therefore, at float 5', along the outer edges, positioning magnets are also disposed at the respective positions which are supposed to hold the drops 11 in position. Positioning magnets 24 are substantially weaker with respect to their magnetic field strength than indicator magnet 8.

FIGS. 5a and b show a solution in which float 5' again has the shape of a semicircular disk according to FIG. 4 but has an additional trimmer 22.

From the lowest point of the float, a weight is provided e.g. as a set screw, being adjustable in radial direction through threading back and forth in a dead end tap hole, whereby the distance of the center of gravity of float 5' from it pivot axis 10 can be adjusted.

Otherwise, magnet 8 is provided in the solution according to FIG. 5, again, as a stick magnet and oriented as in FIG. 2. The float chamber is filled with two fluids 7a, b with different weights.

Figure 6:
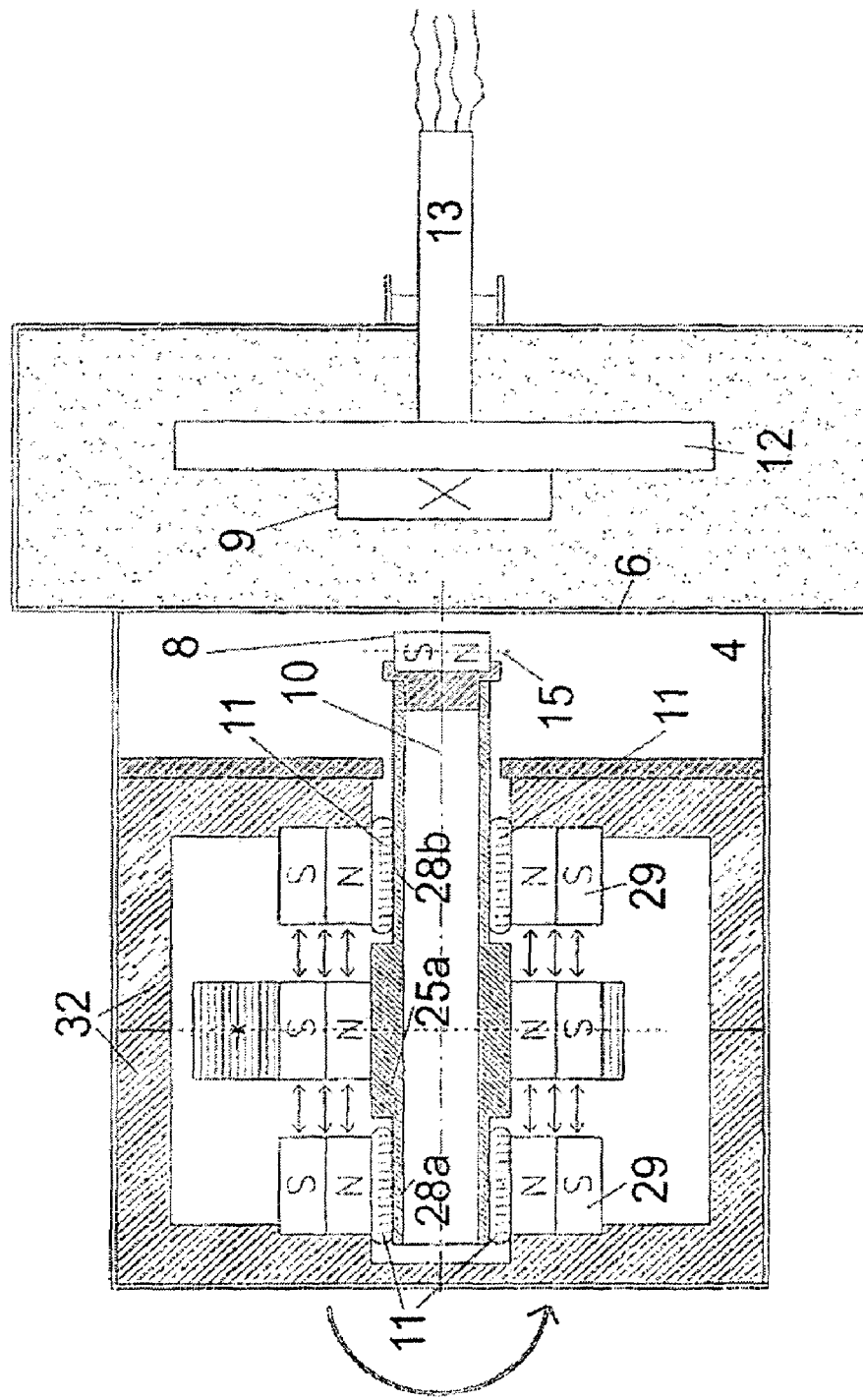
FIG. 6 shows a pendulum with ferrofluidic support in a first embodiment.
Figure 8:
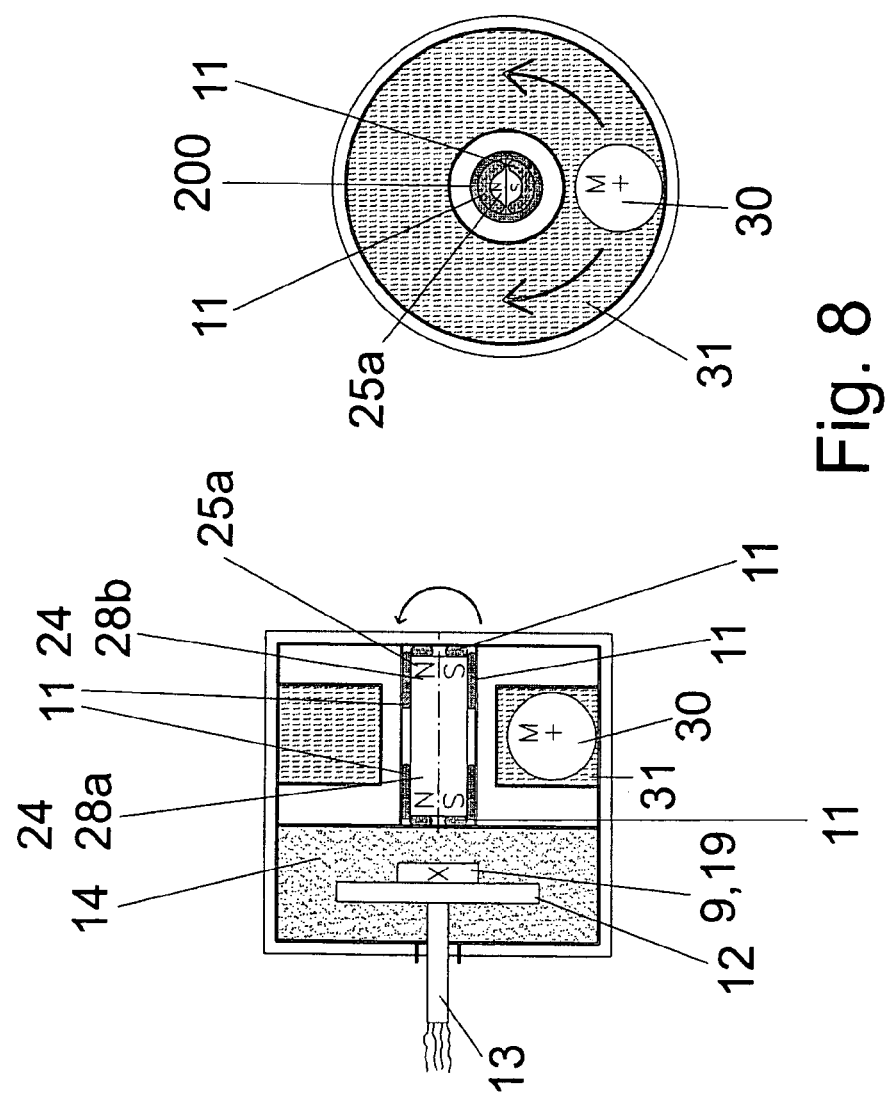
FIG. 8 shows a pendulum with ferrofluidic support in a third embodiment.

The FIGS. 6 through 8 show inclination sensors in which an indicator magnet 8 is also disposed on a body aligning itself according to gravity, in particular, a pendulum 25, on its pivot axis 10, preferably on the face side, however, with the pole axis 15 transversal to the pivot axis. A magnetosensitive sensor 9 disposed opposite to indicator magnet 8 can then detect the pivot position of indicator magnet 8, and thus the inclination of the component on which the inclination sensor is mounted, wherein a wall 6 can also extend between indicator magnet 8 and sensor 9, as long as it is made from non-magnetizable material.

Magnetosensitive sensor 9 is preferably provided as integrated circuit (IC), in particular, according to the multi-Hall-principle, and disposed on a printed circuit board 12 which transmits the determined data through a cable 13 or also wirelessly via radio.

In the solution according to FIG. 6, pendulum 25 is mounted on a pendulum axle body 25a so that the support pinions 28a, b of this pendulum axle protrude on both face sides of the pendulum 25 and are supported in supports 29, wherein the one support pinion 28b extends through the support and carries indicator magnet 8 at its extended end. This extended end also extends through an opening of a magnetic shielding 32 which surrounds the entire pendulum and its support as a housing.

Support pinions 28a, b are ferrofluidically supported in supports 29 in a radial manner. The ferrofluid 11 is held as an annular layer enclosing the respective support pinion 28a, b in a radial manner so that, in this case, support 29 is provided magnetic respectively and thereby holds the ferro fluid 11 at its north pole. Accordingly, the support is configured so that the magnetization axis of the magnets contained in it extends in a radial direction, with the north pole facing the interior circumference of the support, in particular provided as an annular two-layer magnet whose interior ring is the north pole and whose outer ring is the south pole.

Pendulum 25 is centered in axial direction, in so far as it is preferably provided magnetic in the same radial areas, as the supports, also aligned radially with a pole axis, and also pointing inward with the north pole, so that the pendulum is being held through the repulsion of the internally located north poles, on the one hand, and of the externally located south poles, on the other hand, between the middle pendulum and the supports on both sides, axially in the middle between the supports 29. For this purpose, the pendulum 25 can either be disposed slideable on pendulum axle bodies 25a or also fixed. Pendulum axle 25a, at least next to the support locations, also has a diameter step with a shoulder towards the middle area so that this shoulder would axially abut to the ferrofluid cushion 11 and would also be supported therein in case of a too strong axial displacement of the pendulum axle 25. Since the axial distance of the shoulders in pendulum axle body 25 is smaller than the axial distance of the ferro fluid cushions, this can normally not occur with a solid axial connection with the centered pendulum 25.

FIGS. 7a and b show in a longitudinal sectional view of FIG. 7a and in a cross section through the pendulum of the FIG. 7b, the preferred embodiment (best mode), which differs from FIG. 6 in that support pinions 28a, b, not the supports 29, are magnetic and hold the ferrofluid 11 between support pinions 28a, b and supports 29. Also, here pole axis 15 of these holding magnets extend in support pinions 28a, transversal to pivot axis 10 of pendulum 25. The holding magnets 24 are located preferably close to the face side, free ends of the support pinions 28a, b, which has several advantages.

On the one hand, the one holding magnet thereby directly serves as an indicator magnet 8 for the opposite magnetosensitive sensor 9, which is disposed there mounted in place, and not rotating with the pendulum, preferably again on a printed circuit board 12, and in the form of a multi-Hall-IC 19. On the other hand, it is accomplished through the face side external configuration of the holding magnet that the ferrofluid 11 does not only accumulate radially around the support surfaces of the support pinions 28a, b, but also axially on the free face surface of support pinions 28a, b so that hereby the pendulum is also supported in the axially surrounding housing 200 of the pendulum, which needs face walls for this purpose, whose free inner distance is only larger than the axial extension of the pendulum body axle 25a by the thickness of the axial cushions of ferrofluid 11.

Pendulum 25, in this case, is not only mounted in a rotationally fixed manner but also axially fixed on pendulum axle 25a, or possibly provided integrally with it, wherein the space in which pendulum 25 rotates is filled with a fluid 7, preferably an inert fluid.

FIG. 8 shows an embodiment in which the pendulum is made from two mechanically non-connected parts.

One the one hand, the cylindrical axle body 25a having end sections being supported in a support radially and also axially, as support pinions 28a, b, wherein a transversal wall serves as an axial support surface respectively. The support pinions 28a, b, are thus supported in the supports through a ferrofluid, with the ferrofluid being held in a support slot in between at the radial circumferential surfaces and at the front faces of the support pinions 28a, b, since these support pinions 28a, b are magnetic (holding magnets 24) with a pole axle disposed diametrical relative to the rotation axis of the support pinions.

The other part of the pendulum is made from a separate sphere 30 which rolls in an annular channel 31, which extends preferably concentric around the support pinion, and always moves to the lowest spot of the annular channel following gravity.

Since sphere 30 is made from ferromagnetic material, it influences the magnetic field of magnets 24 in said pendulum axle body 25a so that they always align toward the sphere with the same of their two poles and, thereby, the entire pendulum axle body 25a connected in rotationally fixed manner with magnets 24.

One of the two holding magnets 24 thus simultaneously serves as indicator magnet 8 for the frontal, opposing sensor element, separated by a transversal wall, provided as a multi-Hall-IC 19, which is situated on printed circuit board 12, again encased in an encasement material 14.

REFERENCE NUMERALS

1 Inclination sensor
2 Housing
2' Outer housing
3 Sensor chamber
4 Float chamber
5, 5' Float
6 Divider wall
7 Fluid
7a Fluid level
8 Indicator magnet
9 Magnetosensitive sensor
10 Pivot axis
11 Ferrofluid
11' Annular protrusion
12 Printed circuit board
13 Cable
14 Encasement material
Pole axis
16 Gas volume
17 Point
18 Slosh baffle
19 Multi-Hall-IC
20 Neutral magnetic axis (target pivot axis)
21 Throttle opening
22 Trimmer
23a Front wall
23b Rear wall
24 Holding magnet
25a Axle body
25b Capture device
25 Pendulum
26 Pendulum line
27 Center of gravity
28a, b Support pinions
20 Support
30 Sphere
31 Annular channel
32 Magnetic Shielding

What is claimed is:

1. An inclination sensor, said sensor comprising:
   a housing (2) with a chamber (4) having one wall (6) made from a material that cannot be magnetized;

an indicator magnet (8) movable directly or indirectly according to gravity in the chamber (4);

a magnetosensitive sensor (9) outside of the chamber (4); and wherein the indicator magnet (8) is disposed in a rotationally fixed fashion on a pivot axis (10) of a pendulum (25), which is supported ferrofluidic, with its pole axis (15) disposed transversal to the pivot axis (10).

2. The inclination sensor according to claim 1 wherein said pole axis 15 is disposed in a defined relation to a pendulum line (26) and to said pivot axis 10, one of the poles of said indicator magnet (8) always points toward a center of gravity (27).

3. The inclination sensor according to claim 1 wherein said pendulum (25) is supported ferrofluidic in radial direction, as well as in axial direction.

4. The inclination sensor according to claim 3 wherein said pendulum 25 is formed from a central rotationally symmetrical axle body (25a) supported in said housing (2), and a sphere body, mechanically separated from it, and movable in an annular channel, running around the axle body (25a) in a radial manner, wherein said axle body (25a) includes a magnet with a pole axis diametrical to the rotational axis of the axle body, which is connected torque proof to the axle body.

5. The inclination sensor according to claim 1 wherein a pendulum (25) axle section is provided magnetic with said pole axis transversal to said pivot axis (10), and the magnetized pendulum operates as said indicator magnet (8).

6. The inclination sensor according to claim 1 wherein said pendulum (25) positioned between supports (29) is magnetic with such polarity that it repels from both supports (29) in axial direction, and thereby centers in between.

7. The inclination sensor according to claim 1 wherein supports (29) are magnetic and support pinions (28a,b) of the pivot axis of said pendulum.

8. The inclination sensor according to claim 1 wherein said pendulum moves in a fluid (7) reducing dynamic friction.

9. The inclination sensor according to claim 1 wherein said housing (2), immediately surrounding the ferrofluidic support, is made from a non-ferromagnetic material.

10. The inclination sensor according to claim 1 wherein said housing (2) made from ferromagnetic material is disposed around said indicator magnet (8) and said magnetosensitive sensor (9).

11. The inclination sensor according to claim 1 wherein said magnetosensitive sensor (9) is a Hall-sensor or a magneto-resistive sensor provided as an integrated circuit.

12. The inclination sensor according to claim 11 wherein said Hall-sensor is a multi-Hall sensor capable of measuring a magnetic field gradient.

13. The inclination sensor according to claim 1 wherein said pendulum (25), at least its axle body (25a), has an axial length which is at least twice the size of its diameter.

14. An inclination sensor, said sensor comprising:
    a housing (2) with a float chamber (4) with a divider wall (6) made from non-magnetic material;
    an indicator magnet (8) located in the float chamber (4) moveable directly or indirectly according to gravity;
    a magnetosensitive sensor (9) outside of the float chamber (4); and
    wherein the indicator magnet (8) is disposed on a float (5, 5') that floats on a fluid (7) located in the float chamber (4), and
    wherein protrusions with small surfaces are disposed on the outside of said float or on an inside of said float chamber (4) for contacting an other respective element.

15. The inclination sensor according to claim 14 wherein an outer contour of said float (5) is adapted to an inner contour of said float chamber (4) and wherein said float chamber (4) has a contour being at least partly shaped like a segment of a circle when seen in the direction of a pivot axis of said float (5), i.e. when seen in a transverse direction with respect to said divider wall.

16. The inclination sensor according to claim 14 wherein a width of said float (5) fills an inner free width of said float chamber (4) almost entirely when seen perpendicular to a plane of said divider wall (6), so that a perpendicular with respect to the divider wall extending centered with respect to said inner free width of said float chamber (4) forms a pivot axis (10) of said float (5).

17. An inclination sensor, said sensor comprising:
    a housing (2) with a float chamber (4) with a divider wall (6) made from non-magnetic material;
    an indicator magnet (8) located in the float chamber (4) moveable directly or indirectly according to gravity;
    a magnetosensitive sensor (9) outside of the float chamber (4); and
    wherein the indicator magnet (8) is disposed on a float (5, 5') that floats on a fluid (7) located in the float chamber (4), and
    wherein a magnet axis is parallel with the fluid level but transverse and perpendicular to a pivot axis of the magnet.

18. An inclination sensor, said sensor comprising:
    a housing (2) with a float chamber (4) with a divider wall (6) made from non-magnetic material;
    an indicator magnet (8) located in the float chamber (4) moveable directly or indirectly according to gravity;
    a magnetosensitive sensor (9) outside of the float chamber (4); and
    wherein the indicator magnet (8) is disposed on a float (5, 5') that floats on a fluid (7) located in the float chamber (4), and
    wherein said indicator magnet (8) is located in or on said float (5) so that said indicator magnet is at an elevation of the fluid level.

19. An inclination sensor, said sensor comprising:
    a housing (2) with a float chamber (4) with a divider wall (6) made from non-magnetic material:
    an indicator magnet (8) located in the float chamber (4) moveable directly or indirectly according to gravity;
    a magnetosensitive sensor (9) outside of the float chamber (4); and
    wherein the indicator magnet (8) is disposed on a float (5, 5') that floats on a fluid (7) located in the float chamber (4), and
    wherein a slosh baffle (18) is disposed in said float chamber (4) to prevent a full rotation of said float (5).

20. The inclination sensor according to claim 19 wherein pass-through openings are disposed in said slosh baffle as throttle locations.

21. An inclination sensor, said sensor comprising:
    a housing (2) with a float chamber (4) with a divider wall (6) made from non-magnetic material;
    an indicator magnet (8) located in the float chamber (4) moveable directly or indirectly according to gravity;
    a magnetosensitive sensor (9) outside of the float chamber (4); and
    wherein the indicator magnet (8) is disposed on a float (5, 5') that floats on a fluid (7) located in the float chamber (4), and wherein said float chamber (4) is filled with two hard to mix fluids (7) having different specific weights, and said float (5) floats, on the heaviest of the two fluids.

22. An inclination sensor, said sensor comprising:
a housing (2) with a float chamber (4) with a divider wall (6) made from non-magnetic material;
an indicator magnet (8) located in the float chamber (4) moveable directly or indirectly according to gravity;
a magnetosensitive sensor (9) outside of the float chamber (4); and
wherein the indicator magnet (8) is disposed on a float (5, 5') that floats on a fluid (7) located in the float chamber (4), and
wherein said float (5) has its centre of gravity at an elevation of the fluid level, and in the geometric centre of the float, which is provided symmetrical in at least one axis.

23. The inclination sensor according to claim 22 wherein said float (5) is provided slick-shaped and its longitudinal axis is disposed along the diameter, through a round float chamber (18) and extends over the entire diameter of said float chamber.

24. The inclination sensor according to claim 23 wherein the ends of said stick-shaped float are rounded or pointed.

25. The inclination sensor according to claim 23 wherein a cross section of said stick-shaped float (5) is provided round, at least in the area of its largest outer diameter.

26. The inclination sensor according to claim 23 wherein said stick-shaped float (5) has several annular circumferential protrusions (11) at plural longitudinal positions.

27. The inclination sensor according to claim 23 wherein said indicator magnet (8) is disposed in an interior of said float on a pivot axis (10), and said float is made from material that cannot be magnetized.

28. An inclination sensor, said sensor comprising:
a housing (2) with a float chamber (4) with a divider wall (6) made from non-magnetic material;
an indicator magnet (8) located in the float chamber (4) moveable directly or indirectly according to gravity;
a magnetosensitive sensor (9) outside of the float chamber (4); and
wherein the indicator magnet (8) is disposed on a float (5, 5') that floats on a fluid (7) located in the float chamber (4), and
wherein a centre of gravity of said float is located below the fluid level, and
wherein said float extends over an entire diameter of said float chamber, and said indicator magnet is located on an axis of said float with said float having a rotationally symmetric shape.

29. The inclination sensor according to claim 28 wherein said float has a circular segment shape.

* * * * *